United States Patent [19]

Dailey

[11] 4,063,088

[45] Dec. 13, 1977

[54] METHOD OF AND MEANS FOR TESTING A GLANCING-INCIDENCE MIRROR SYSTEM OF AN X-RAY TELESCOPE

[75] Inventor: Carroll C. Dailey, Huntsville, Ala.

[73] Assignee: The United States of America as represented by the Administrator of the National Aeronautics and Space Administration, Washington, D.C.

[21] Appl. No.: 636,193

[22] Filed: Nov. 25, 1975

Related U.S. Application Data

[63] Continuation-in-part of Ser. No. 445,398, Feb. 25, 1974, abandoned.

[51] Int. Cl.[2] .......... G01N 23/20

[52] U.S. Cl. .......... 250/272; 250/320

[58] Field of Search .......... 250/272, 273, 493, 308, 250/280, 320, 321, 322, 323; 219/121 L, 121 LM

[56] References Cited

U.S. PATENT DOCUMENTS

| | | | |
|---|---|---|---|
| 2,559,972 | 7/1951 | Kirkpatrick | 250/280 |
| 3,567,938 | 3/1971 | Piekenbrock | 250/308 |

*Primary Examiner*—David C. Nelms
*Attorney, Agent, or Firm*—L. D. Wofford, Jr.; G. J. Porter; John R. Manning

[57] ABSTRACT

Apparatus for testing a glancing-incidence mirror system for an X-ray telescope, wherein the system has an even number of coaxial and confocal reflecting surfaces, includes an X-ray laser for generating a collimated beam of X-rays directed along the axis of the system so that the beam is incident on the reflecting surfaces and illuminates a predetermined area thereof. An X-ray detector, such as a photographic film, is located at the common focus of the surfaces so that the image thereon produced by the X-rays will provide a measure of the resolution and efficiency of the system.

2 Claims, 1 Drawing Figure

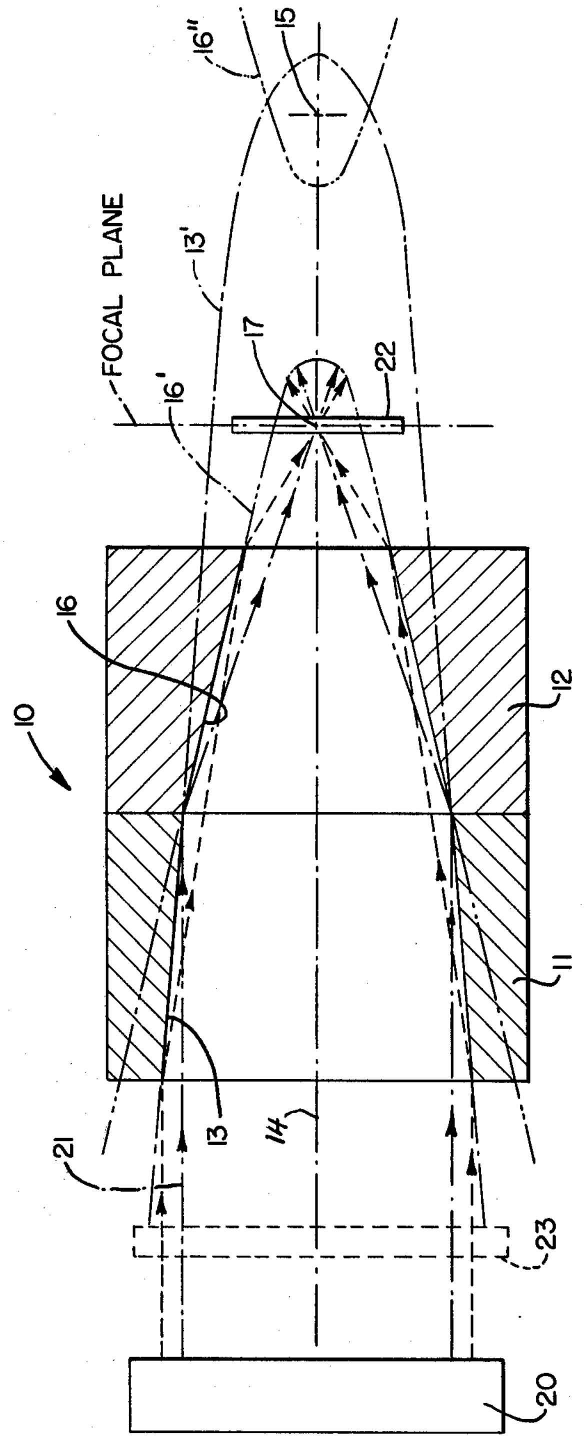
FOCAL PLANE
10
11
12
13
13'
14
15
16
16'
16"
17
20
21
22
23

METHOD OF AND MEANS FOR TESTING A GLANCING-INCIDENCE MIRROR SYSTEM OF AN X-RAY TELESCOPE

ORIGIN OF THE INVENTION

The invention described herein was made by an employee of the United States Government and may be manufactured and used by or for the Government for governmental purposes without the payment of any royalties thereon or therefor.

This application constitutes a continuation-in-part of co-pending application entitled, "Testing Device Using X-Ray Lasers", Ser. No. 445,398, filed Feb. 25, 1974 now abandoned.

BACKGROUND OF THE INVENTION

This invention relates to a method of and means for testing a glancing-incidence mirror system for an X-ray telescope, and more particularly, for a Wolter telescope.

Wolter telescopes, particularly type I telescopes, have been widely used for solar X-ray studies aboard space vehicles, and the results obtained to date suggest such telescopes hold great promise for future investigation of cosmic X-ray phenomena. A Wolter telescope uses glancing-incidence reflection optics based on internal conic sections of revolution about the optical axis of the telescope. To obtain good images, it has been demonstrated that an even number of reflecting surfaces are required. In a type I telescope, the optics are in the form of a glancing-incidence paraboloidal primary and a coaxial and confocal hyperboloidal secondary. That is to say, the primary is formed by a sleeve-like member whose interior surface is a portion of a paraboloid of revolution about the axis of the sleeve; and the secondary is formed by another sleeve-like member abutting the first member, and having an interior surface that is a portion of a hyperboloid of revolution about the sleeve axis. Thus, both conic sections have a common axis, and the sections are chosen so that they share a common focus.

It is well known that the percentage of an X-ray beam reflected from a surface is functionally related to the wavelength of the radiation and the angle at which the beam strikes the surface. In general, for a given angle, the longer the wavelength, the greater the percentage of X-rays reflected; and as the angle between the beam and the surface decreases, the percentage of the beam reflected increases. Suitable results are achieved when the angle is of the order of magnitude of 1°, hence the term glancing-incidence.

Para-axial X-rays in the annular region defined by the projection of a properly designed paraboloid on a plane perpendicular to the optical axis will strike the internal surface of the paraboloid mirror at less than the critical angle and, as a consequence, such rays will be almost totally reflected toward the focus of the paraboloid. Most of these reflected rays are then intercepted by the internal surface of the hyperboloid mirror. If this mirror is properly configured, the intercepted rays will again be almost totally reflected and converge at the paraboloid-hyperboloid focus. Because X-rays passing through this focus have been reflected from two surfaces, relatively good images will be obtained.

Early telescopes (ca 1963) utilized machined aluminum or cast epoxy mirrors, but the surface configuration and finish were such that the telescopes had reflecting efficiencies of about 1% and a resolution of about several arc minutes. Improved materials and fabrication techniques since then have significantly improved these parameters.

It is recognized that the angular resolution is relatively insensitive to local surface finish, and is limited, essentially, by the surface tolerances. Because imaging tests using visible light are not sufficiently sensitive to the surface defects in mirrors used at grazing incidence, special methods of testing have been employed. In one such method, the departure of the surface from a cone as a function of the distance along the axis thereof is determined by placing a glass test plate of known profile in contact with the reflecting surface and observing the pattern of interference fringes. In an actual telescope tested in this manner, it developed that the actual resolution achieved during use in flight was significantly better than ground based test results indicating that the resolution was limited by the laboratory test arrangement rather than by the telescope.

As to the effect of surface finish on efficiency, it is well known that the present state of the art of finishing mirrors produces irregularities that greatly exceed the Rayleigh criterion for a perfect reflecting surface. A direct technique for observing irregularities remains to be developed. However, new techniques promise to reduce deviations from the desired surface profile and reduce local surface rangliness.

There remains, however, the basic problem of testing a telescope on the ground before launch in a way that simulates the actual conditions of use. In other words, the telescope is to be used to record phenomena originating at galactic distances so that X-ray beams incident on the telescope are essentially parallel; but it has, heretofore, been very difficult to simulate this situation.

The difficulty arises because X-rays cannot conveniently be focused or made parallel by conventional optics, as can visible light. Therefore, the X-ray source is usually placed at a large distance from the device to be tested to approximate, to the desired degree, a source at infinity. Because X-rays are strongly absorbed by the constituents of the atmosphere at normal pressure, an evacuated path is required. This combination of long path and high vacuum is costly and results in a large, unwieldy machine that can test only a limited portion of the optics of a telescope.

While devices for collimating X-rays are known, these devices are complex and expensive, and usually absorb a substantial portion of the X-rays they are supposed to collimate.

It is therefore an object of the present invention to provide a new and improved method of and means for testing a glancing-incidence mirror system for an X-ray telescope wherein the above-described deficiencies are substantially overcome or reduced.

SUMMARY OF THE INVENTION

According to the present invention, an X-ray source in the form of an X-ray laser is used for generating a collimated source of X-rays directed along the axis of a glancing-incidence mirror system having an even number of coaxial and confocal reflecting surfaces, so that the beam is incident on the primary reflecting surface. An X-ray detector, such as a sheet of photographic film, is located at the common focus of the surfaces so that the image thereon produced by the reflected X-rays will provide a measure of the resolution and efficiency of the system.

The advantages of the X-ray device of the present invention are evident. Since the X-rays are generated by laser action, the generated X-ray beam is well collimated, and therefore, the laser or array of lasers can be located very near to the device to be tested. X-ray absorption by air molecules is thereby greatly reduced, and hence no vacuum is necessary. The result is an X-ray testing device which is less complex and less expensive to build than the prior art devices, and which is compact in size.

BRIEF DESCRIPTION OF THE DRAWING

An embodiment of the invention is shown in the accompanying drawing, the single FIGURE of which illustrates the mirror system of a Wolter type I X-ray telescope.

DESCRIPTION OF THE PREFERRED EMBODIMENT

Referring now to the drawing, reference numeral 10 designates the optical system of a Wolter type I X-ray telescope the system comprising a primary mirror 11 and a secondary mirror 12, each of which is fabricated in a manner well known in the art from fused silica, Kanigen (a nickel-phosphorus alloy) coated beryllium, or other suitable material. Mirror 11 is sleeve-like and provided with an interior surface 13 that constitutes a conic section in the form of a portion of a paraboloid of revolution about the axis 14 of the sleeve, such axis defining the optical axis of the optical system. This paraboloid is indicated by reference numeral 13' and has a focus located at the point 15 to the rear of mirror 12.

Mirror 12, which nests with or abuts mirror 11, is also sleeve-like, and has an interior surface 16 that constitutes a conic section in the form of a portion of a hyperboloid of revolution about axis 14. This hyperboloid is indicated by reference numeral 16', and its other branch is indicated by reference numeral 16''. One of the conjugate foci of the branches is located at point 15, and the other focus is located in the vicinity of point 17. The conic sections are chosen so that para-axial beams strike the mirrors at glancing angles of about 1°.

As can be seen in the drawing, there exists an annular region, defined by the projection of a paraboloid of mirror 11 on a plane perpendicular to the axis 14, wherein para-axial rays passing through such region will be almost totally reflected toward the focus 15 of the paraboloid. Most of these rays, however, will be intercepted by the internal surface 16 of mirror 12, and most will again be totally internally reflected and converge at the paraboloid-hyperboloid focus 17 which lies in the focal plane of the optical system. Thus, most of the para-axial X-rays entering the optical system through the annular region defined above will be reflected from two surfaces before passing through focus 17 permitting relatively good images to be obtained at this point by placing a sheet of photographic film in the focal plane.

Para-axial X-rays directly striking the hyperboloid (i.e., those rays that are not reflected by the paraboloid) will also undergo reflection. However, the glancing angle of these X-rays will be considerably higher than for those striking the paraboloid element first. Consequently, the reflection efficiency of the hyperboloid element for X-rays directly striking this element will be lower than the efficiency of the paraboloid element for the more energetic X-rays. The hyperboloid element will nevertheless effectively reflect soft X-rays that have a critical angle larger than the glancing angle of incidence. Those X-rays reflected by the hyperboloid only will converge toward a "pseudo-focus" region located between the high resolution focus 17 and the mirrors. Since these rays will have been reflected by a single element only, they will produce low quality images that suffer from both coma and spherical aberration.

For solar X-ray investigation, stops are placed at the entrance and exit to the mirrors to eliminate radiation striking just the hyperboloid. For cosmic X-ray astronomy, the larger reflecting angle of the hyperboloid provides a significantly greater collecting area than afforded by the paraboloid alone. For X-rays of sufficient wavelength, the resultant greater angle of incidence will permit effective reflection so that a wide-field detector placed in the hyperboloid pseudo-focus should be advantageous in soft X-ray astronomy.

After the mirrors 11 and 12 have been constructed and assembled, it would be helpful to be able to test the assembly to determine its efficiency and resolving power. To this end, an X-ray laser is used to generate a collimated beam of X-rays directed parallel to the axis of the mirror system, thus effectively simulating the parallel rays of X-rays received by the system when used in solar and cosmic X-ray astronomy.

Reports of discovery of x-ray lasers are very recent. Theoretical explanations of X-ray laser operation, as well as a survey of the most up-to-date techniques for achieving X-ray laser action are found in an article entitled "X-ray Lasers, a Status Report" by Dugway et al published in the November, 1973 issue of *Laser Focus*. This article is incorporated herein by reference, and no further description of X-ray laser action is necessary here.

Reference numeral 20 designates an X-ray laser or an array of lasers producing a well-collimated beam or a composite of well-collimated beams of X-rays incident on primary mirror 11. The cross-section of the X-ray laser input is large enough to illuminate a significant portion of at least the annular region 21 described above. Furthermore, the laser or array of lasers is located as near as practical to the mirror system 10, and the testing can be carried out under atmospheric conditions. Thus, no vacuum path for the X-rays is required because the laser is so close to the mirror system that very little absorption of the radiation by the atmosphere takes place.

A sheet of photographic film 22 is placed at the high-resolution focus 17 of the system so that upon exposure to the X-rays reflected by the mirror system, the performance of the focusing achieved by the system can be evaluated. To further assist in evaluating the quality of the mirror system, a pattern 23 can be interposed between laser 20 and the primary mirror 11. The pattern will absorb some of the radiation and pass some allowing the image obtained on film 22 to be compared with the pattern to evaluate resolution and other parameters associated with the quality of the mirror system.

Obviously, many modifications and variations of the present invention are possible in light of the above teachings. It is therefore to be understood that, within the scope of the appended claims, the invention may be practiced otherwise than as specifically described.

What is claimed is:

1. Apparatus for testing a glancing-incidence mirror system of an X-ray telescope, the system having an even number of coaxial and confocal reflecting surfaces comprising:

a. an X-ray laser for generating a collimated test beam of X-rays directed along the axis of the system and incident on a substantial area of the reflecting surfaces;

b. a sheet of film located at the common focus and lying in the focal plane of the reflecting surfaces; and c. a test pattern interposed between the laser and the mirror so that the resultant image on the film can be compared with the test pattern to determine the performance of the system.

2. A method for testing a glancing-incidence mirror system of an X-ray telescope, the system having an even number of coaxial and confocal reflecting surfaces comprising:

a. illuminating the system with a collimated beam of X-rays directed along the optical axis of the system and derived from an X-ray laser;

b. locating a sheet of film in the focal plane of the reflecting surface; and c. interposing, between the laser and the system, a test pattern so that the image produced on the film can be compared with the test pattern to determine the efficiency and resolution of the system.

* * * * *